United States Patent [19]

Ootani et al.

[11] Patent Number: 4,549,641

[45] Date of Patent: Oct. 29, 1985

[54] CLUTCH DISC

[75] Inventors: Hisao Ootani; Satoru Maruyamano, both of Toyota, Japan

[73] Assignee: Toyota Jidosha Kabushiki Kaisha, Aichi, Japan

[21] Appl. No.: 406,012

[22] Filed: Aug. 6, 1982

[30] Foreign Application Priority Data

Oct. 6, 1981 [JP] Japan .................... 56-149064[U]

[51] Int. Cl.$^4$ ................ F16D 3/14; F16D 3/66
[52] U.S. Cl. ................ 192/106.2; 192/106.1; 464/68
[58] Field of Search .......... 192/106.2, 106.1; 464/68, 46

[56] References Cited

U.S. PATENT DOCUMENTS

| | | | |
|---|---|---|---|
| 3,327,820 | 6/1967 | Maurice | 192/106.2 X |
| 3,931,876 | 1/1976 | Beeskow et al. | 464/68 X |
| 3,938,635 | 2/1976 | Davies et al. | 192/106.2 |
| 3,982,617 | 9/1976 | Worner | 192/106.2 |
| 4,018,320 | 4/1977 | Schrape et al. | 464/68 X |
| 4,044,874 | 8/1977 | Worner | 464/68 X |
| 4,212,380 | 7/1980 | Billet | 192/106.2 |
| 4,222,476 | 9/1980 | LeBrise | 192/106.2 |
| 4,354,586 | 10/1982 | Stanley | 192/106.2 |
| 4,406,357 | 9/1983 | Nagano et al. | 192/106.2 |

FOREIGN PATENT DOCUMENTS

| | | | |
|---|---|---|---|
| 2225650 | 11/1974 | France | 192/106.2 |
| 1428557 | 3/1976 | United Kingdom | 192/106.2 |

Primary Examiner—Rodney H. Bonck
Attorney, Agent, or Firm—Parkhurst & Oliff

[57] ABSTRACT

Disclosed herein is a clutch disc comprising a thrust plate incorporated between the first frictional plate, which is interposed between the subdisc plate and the hub flange, and the hub flange, so as to rotate relatively to the hub flange within the range of slight angular displacement corresponding to the amount of play defined between the pawl portion of the thrust plate and the cutaway portion of the aperture opened through the hub flange, and a frictional plate fixed to the thrust plate on the flange side, said frictional plate having a smaller frictional coefficient than the first frictional plate.

3 Claims, 5 Drawing Figures

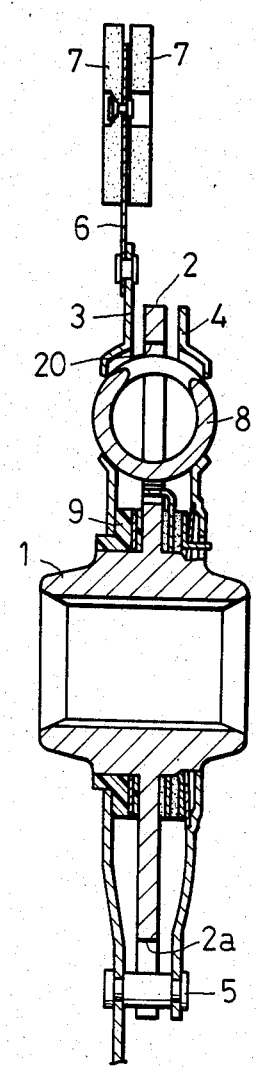
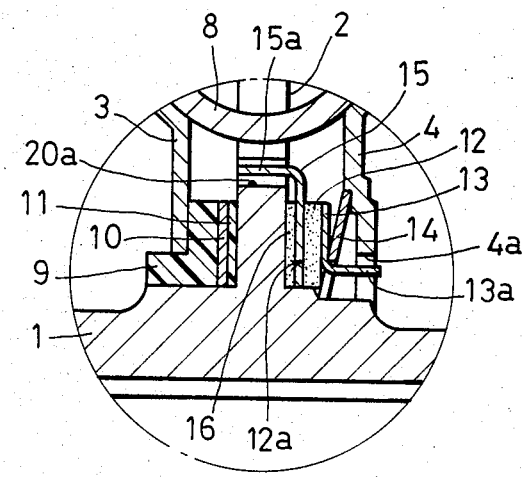
FIG. 2
FIG. 3

CLUTCH DISC

BACKGROUND OF THE INVENTION

This invention relates to a clutch disc of an automotive friction clutch.

Generally, in a power transmitting system of an automobile, various vibration and noise are generated by synchronized torsional vibration of the system or backlash of gears in a transmission or a differential gear. In order to eliminate such a disadvantage, it is well known that a hysteresis characteristic of the clutch disc is controlled and that there exists an optimal hysteresis characteristic to reduce such vibration and noise corresponding to the amount of the vibration and the nature of the noise.

The prior art has proposed the utilization of nonlinear characteristic obtained by the internal hysteresis by using rubber for a torsional damper of the clutch disc. The prior art has also proposed the variation of the hysteresis characteristic of the cluth disc in response to the variation of a torsional angle of the clutch disc, for example, as is disclosed in Japanese Laid-Open Patent Publication No. 48-69936. However, according to the former teaching, it may not be anticipated that the above mentioned vibration and noise are sufficiently reduced, while according to the latter teaching, the invention has not yet been put to practical use because of the complicated structure and unsatisfactory durability.

SUMMARY OF THE INVENTION

Accordingly, a primary object of the present invention is to provide a clutch disc which is simple in structure.

Another object of the present invention is to provide a clutch disc which may obtain an optimum hysteresis characteristic for suppressing various vibration and noise generated in the power transmitting system of an automobile.

A further object of the present invention is to provide a clutch disc which may stabilize hysteresis obtained by friction of the slide surfaces of the frictional members installed between the flange of a clutch disc hub and each disc plate provided on both sides of the flange.

According to the present invention, a clutch disc hub has a flange integrally formed therewith along its outer circumference. On both sides of the hub flange, a disc plate and a subdisc plate are provided and connected by stopper pins. A first frictional plate is interposed between the subdisc plate and the hub flange. A thrust plate is incorporated between the first frictional plate and the flange, so as to rotate relatively to the hub flange within the range of slight angular displacement. A second frictional plate having a smaller frictional coefficient than the first frictional plate is fixed to the thrust plate on the flange side.

Various general and specific objects, advantages and aspects of the invention will become apparent when reference is made to the following detailed description of the invention considered in conjunction with the related accompanying drawings.

BRIEF DESCRIPTION OF THE DRAWINGS

FIG. 2 is a vertical cross-sectional view of the clutch disc;

FIG. 3 is an enlarged cross-sectional view of the essential part in FIG. 2;

DETAILED DESCRIPTION OF THE PREFERRED EMBODIMENTS

Figure 1:
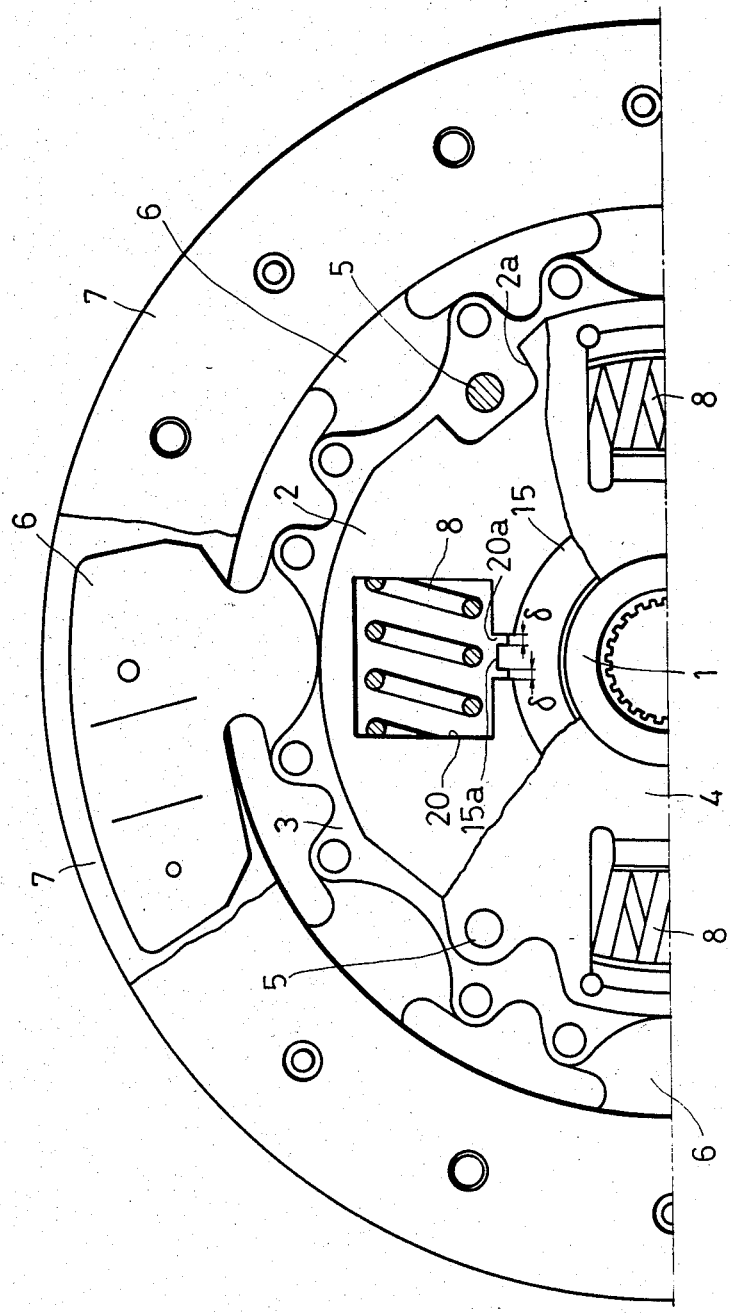
FIG. 1 is a plan view of a part of the clutch disc illustrated partially in cutaway view according to the preferred embodiment.

Referring now to FIGS. 1 and 2 which show a part of the clutch disc, reference numeral 1 designates a clutch disc hub having a flange 2 integrally formed therewith along its outer circumference. A disc plate 3 and a subdisc plate 4 are provided on both sides of the flange 2. A plurality of cutaway portions 2a are formed along and spaced evenly around the outer circumference of the flange 2. Both the plates 3 and 4 are linked by a plurality of stopper pins 5 located at the cutaway portions 2a, so that a play angle A is defined between the flange 2 and the plates 3 and 4. A plurality of disc springs 6 are fixed to the outer circumference of the disc plate 3 along its circumferential direction. A facing 7 is fixed to both sides of each disc spring 6. A plurality of compression springs 8 are installed between the disc plates 3 and 4 and the flange 2 along the circumferential direction, so as to effect a damping action during torque transmission between the clutch disc hub 1 and the facing 7.

As shown in FIG. 3 illustrating the essential part of FIG. 2, the disc plate 3 is rotatably supported by the clutch disc hub 1 through an annular resin bushing 9 which is L-shaped in section, so as to reduce a frictional resistance therebetween. A resin frictional plate 11 having a stable frictional coefficient and made of tetrafluoroethylene, for example, is interposed between the resin bushing 9 and the flange 2. A metallic plate 10 is interposed between the resin frictional plate 11 and the resin bushing 9, so as to prevent direct contact with each other.

Figure 5:
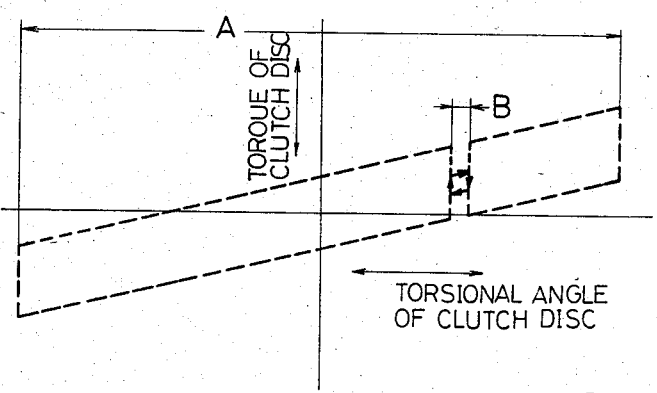
FIG. 5 is a view similar to FIG. 4, in the case that the amplitude of torsional angle of the clutch disc is small.

A first annular frictional plate 12 fixed to a metallic backing plate 13 on the opposite side to the plate 4 is installed between the subdisc plate 4 and the flange 2. A pawl portion 13a of the backing plate 13 is engaged with a cutaway portion 4a of the plate 4, so that the frictional plate 12 may rotate with the plate 4. A Belleville spring 14 is installed between the backing plate 13 and the plate 4, so as to bias the frictional plate 12 toward the flange 2. A metallic thrust plate 15 bonded to a second frictional plate 16 which comes into contact with the flange 2 is interposed between the slide surface 12a of the frictional plate 12 and the flange 2. The thrust plate 15 has a pawl portion 15a engaging a cutaway portion 20a formed at one portion of an aperture 20 opened through the flange 2 for locating the compression spring 8. As should be apparent from FIG. 1, a slight play $\delta$ which corresponds with play angle B as shown in FIG. 5 is provided between both ends of the pawl portion 15a and the cutaway portion 20a, so as to permit relative angular movement of the thrust plate 15 to the flange 2. In other words, the thrust plate 15 may rotate together with the frictional plate 16 relative to the flange 2 within the extent of the play $\delta$. The play angle A is larger than the play angle B. The frictional plate 16 is made of any material having a smaller frictional coefficient than the frictional plate 12 and the resin frictional plate 11. However, the frictional coefficient of the resin frictional plate 11 may be the same as that of the frictional plate 16.

In operation, the clutch disc hub 1 and the facing 7 effect a relative displacement of angle during torque transmission therebetween within the range of play angle defined between the cutaway portion 2a of the flange 2 and the stopper pin 5, while accomplishing the damping action through the compression spring 8. Because of this relative displacement of angle, a frictional force is created on both sides of the resin frictional plate 11. At the same time, sliding actions are created between the first frictional plate 12 and the thrust plate 15, and between the second frictional plate 16 and the flange 2 against frictional forces therebetween. Such frictional forces are dependent upon the material of each frictional plate and the biasing force of the Belleville spring 14. Furthermore, such frictional force determines a hysteresis characteristic of the clutch disc. Since the frictional coefficient of the resin frictional plate 11 is stable, as mentioned above, and the biasing force of the Belleville spring 14 is also stable, the hysteresis of the clutch disc is always maintained stable. The sliding actions created between the flange 2 and the disc plate 3 and 4 are achieved only through the frictional plates, thereby providing a stabler hysteresis characteristic and improving durability of the clutch disc.

As hereinabove described, the hysteresis characteristic varies with the requirement for effectively reducing or suppressing various vibration and noise created during running of automobiles. For example, in order to suppress gear noise generated by backlash of gears in a power transmitting system, it is required to generate a large hysteresis. On the other hand, in order to suppress noise audible in a compartment generated during deceleration of an automobile, it is required to generate a relatively small hysteresis. As is well known in the art, in the case of generating gear noise due to backlash of gears, the relative angular displacement between the clutch disc hub 1 and the facing 7, which angular displacement is referred to as a torsional angle of the clutch disc, is large, while the torsional angle of the clutch disc during deceleration is relatively small. Accordingly, it should be obvious that an amplitude of a torsional angle between the hub 1 and the facing 7 varies in accordance with the characteristics of the power transmitting system based upon various operating conditions of an automotive engine.

Figure 4:
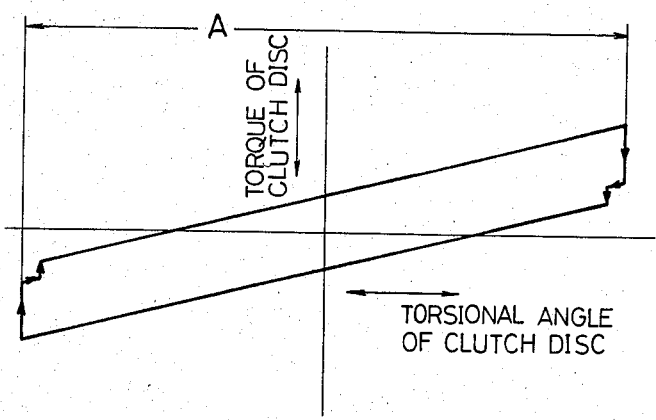
FIG. 4 is a characteristic diagram illustrating a hysteresis characteristic in the case that the amplitude of torsional angle of the clutch disc is large.

In this embodiment, the play δ, which is the relative amount of rotation between the flange 2 and the thrust plate 15, corresponds to the amplitude of the torsional angle of the clutch disc in the case that the noise audible in the compartment is generated during deceleration. Accordingly, when the amplitude of the torsional angle of the clutch disc is extremely small and corresponds to the range of the play δ, friction is created only between the frictional plate 16 having a small frictional coefficient and the flange 2, thereby permitting the hysteresis characteristic of the clutch disc to be restrained in a small range. When the amplitude of the torsional angle increases beyond the range of the play δ, friction is created between the respective frictional plates on the side of the disc plate 3 and on the side of the subdisc plate 4 and the members contacting such frictional plates, thereby providing a large hysteresis. That is to say, when a wide amplitude A of the torsional angle of the clutch disc as shown in FIG. 4 is generated, a large hysteresis characteristic which has substantially the same as the prior art is obtained, thereby reducing or suppressing gear noise due to backlash of gears in a power transmitting system. When a narrow amplitude B of the torsional angle of the clutch disc as shown in FIG. 5 is generated, a small hysteresis characteristic is obtained, thereby reducing or suppressing noise audible in compartment during deceleration of an automobile. Since the hysteresis characteristic varies with the amplitude of the torsional angle of the clutch disc, the small hysteresis in FIG. 5 may be obtained in any position of the torsional angle of the clutch disc within the range of the wide amplitude of the torsional angle as shown in FIG. 4.

Having thus described the preferred embodiments of the invention it should be understood that numerous structural modifications and adaptations may be resorted to without departing from the spirit of the invention.

What is claimed is:

1. In a clutch disc having a circular hub, a circular hub flange fixed on the outer periphery of said hub, a disc plate disposed on one side of said flange, a subdisc plate disposed on the other side of said flange, said disc plate being connected to said subdisc plate by stopper pins at the outer peripheral portions thereof, and said disc plate and said subdisc plate determining a play angle A; an improvement comprising a first frictional plate connected to said subdisc plate so as to rotate therewith, a thrust plate disposed between saib hub flange and said first frictional plate and connected to saib hub flange so as to rotate up to a play angle B relative thereto, said play angle A being larger than said play angle B, an elastic means disposed between said first frictional plate and said subdisc plate for pressing said first frictional plate toward said thrust plate, and a second frictional plate attached to said thrust plate on the hub flange side, said second frictional plate having a smaller frictional coefficient than said first frictional plate.

2. The clutch disc as defined in claim 1 wherein said elastic means is a Belleville spring.

3. The clutch disc as defined in claim 1 wherein said first frictional plate is connected through a backing plate to said subdisc plate.

* * * * *